(12) United States Patent
Jung et al.

(10) Patent No.: US 7,929,639 B2
(45) Date of Patent: Apr. 19, 2011

(54) DEVICE FOR COMPENSATING RADIO FREQUENCY DISTORTION IN ORTHOGONAL FREQUENCY DIVISION MULTIPLEXING TRANSMISSION SYSTEM AND METHOD THEREOF

(75) Inventors: Jae-Ho Jung, Daejeon (KR); Byung-Su Kang, Deajeon (KR); Joon-Hyung Kim, Daejeon (KR); Heon-Kook Kwon, Daejeon (KR); Sung-Jun Lee, Daejeon (KR); Kwang-Chun Lee, Daejeon (KR)

(73) Assignee: Electronics and Telecommunications Research Institute, Deajeon (KR)

( * ) Notice: Subject to any disclaimer, the term of this patent is extended or adjusted under 35 U.S.C. 154(b) by 828 days.

(21) Appl. No.: 11/527,787

(22) Filed: Sep. 27, 2006

(65) Prior Publication Data

US 2007/0133698 A1 Jun. 14, 2007

(30) Foreign Application Priority Data

Dec. 9, 2005 (KR) .................. 10-2005-0120870

(51) Int. Cl.
*H04L 25/49* (2006.01)
(52) U.S. Cl. ..................................... 375/296
(58) Field of Classification Search .............. 375/130, 375/146, 259, 271, 272, 278, 279, 284, 285, 375/295, 296, 357, 355; 455/39, 63.1, 91, 455/114.2, 114.3; 370/203, 204, 208, 210
See application file for complete search history.

(56) References Cited

U.S. PATENT DOCUMENTS

| | | | |
|---|---|---|---|
| 5,930,301 A | 7/1999 | Chester et al. | |
| 6,268,818 B1 | 7/2001 | Xin et al. | |
| 6,449,466 B1 * | 9/2002 | Jin et al. | 455/127.2 |
| 6,621,340 B1 * | 9/2003 | Perthold et al. | 330/149 |
| 2004/0066740 A1 * | 4/2004 | Suh et al. | 370/208 |
| 2004/0087279 A1 * | 5/2004 | Muschallik et al. | 455/73 |
| 2005/0111568 A1 * | 5/2005 | Adachi | 375/295 |

FOREIGN PATENT DOCUMENTS

| | | |
|---|---|---|
| JP | 11-004208 | 1/1999 |
| JP | 2000-261402 | 9/2000 |
| JP | 2004-224571 | 8/2002 |
| JP | 2004-072150 | 3/2004 |
| KR | 1020020090246 | 12/2002 |

* cited by examiner

*Primary Examiner* — David C. Payne
*Assistant Examiner* — Vineeta S Panwalkar
(74) *Attorney, Agent, or Firm* — Ladas & Parry LLP

(57) ABSTRACT

The present invention relates to a device for compensating a radio frequency distortion caused by a sample/hold operation of a digital/analog converter in an orthogonal frequency division multiplexing (OFDM) transmission system, and a method thereof. In a digital transmission system, an edge frequency signal of a transmission signal band is distorted by a sample/hold operation of a digital/analog converter such that a signal attenuation is generated at a frequency domain by a sync function having a zero point at a sample frequency of a transmission signal. In the present invention, the signal distortion may be compensated by multiplying a coefficient of an inverse sync function by a signal weight value at the frequency domain, and it may be compensated by using a single multiplier and a lookup table storing the coefficient of the inverse sync function.

8 Claims, 10 Drawing Sheets

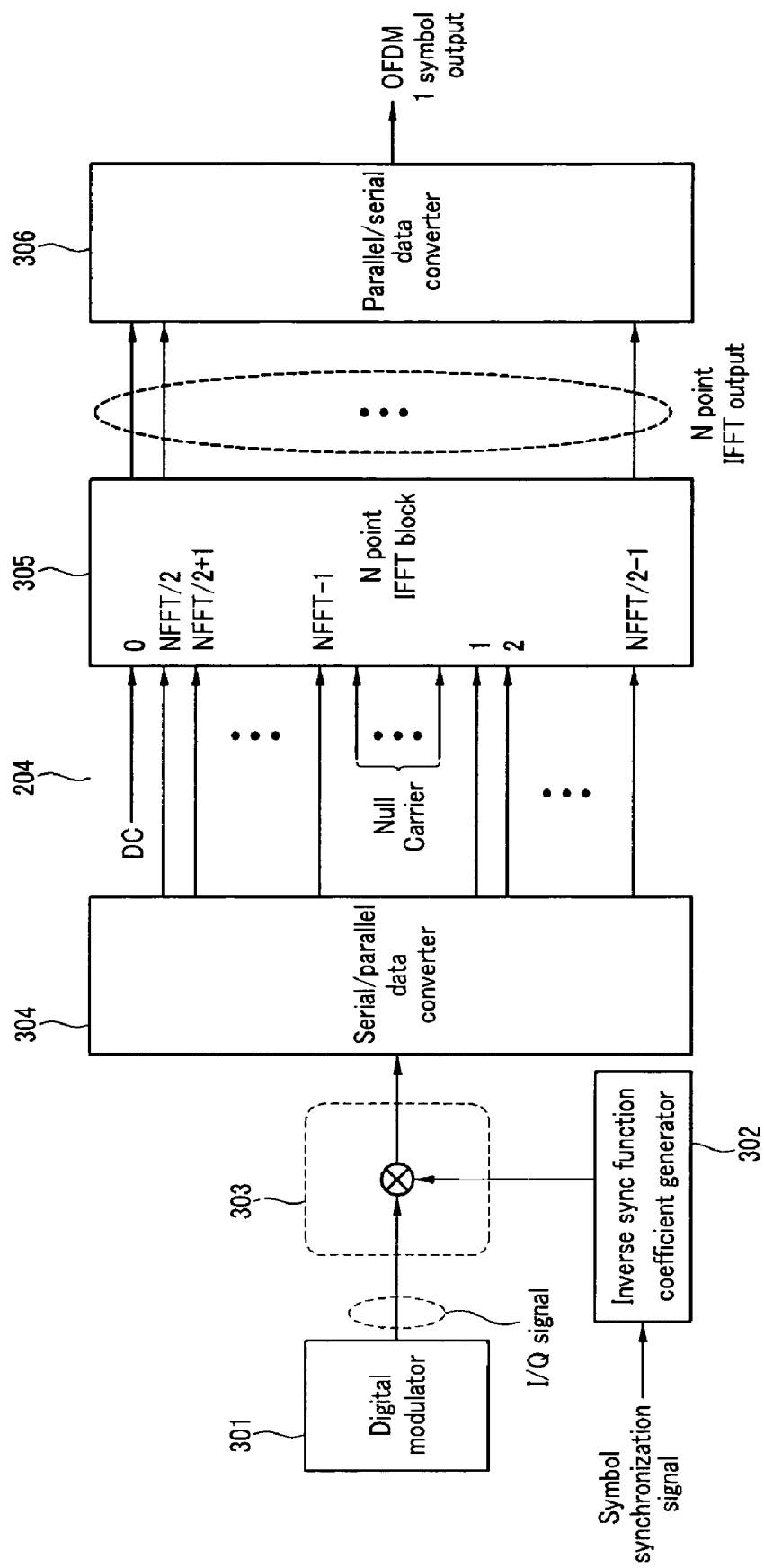

DEVICE FOR COMPENSATING RADIO FREQUENCY DISTORTION IN ORTHOGONAL FREQUENCY DIVISION MULTIPLEXING TRANSMISSION SYSTEM AND METHOD THEREOF

CROSS-REFERENCE TO RELATED APPLICATION

This application claims priority to and the benefit of Korean Patent Application No. 10-2005-0120870 filed in the Korean Intellectual Property Office on Dec. 9, 2005, the entire contents of which are incorporated herein by reference.

BACKGROUND OF THE INVENTION (a) Field of the Invention

The present invention relates to a transmission system in an orthogonal frequency division multiplexing method. More particularly, the present invention relates to a device for compensating a distortion of a transmission signal, the distortion caused by a digital/analog converter, and a method thereof.

(b) Description of the Related Art

In an orthogonal frequency division multiplexing transmission system, digital data modulated in various modulation methods are robust against distortions caused by wireless multipaths since orthogonal frequencies are used to transmit the modulated digital data, and a bidirectional communication may be performed by using a simplified receiver. Particularly, in an orthogonal frequency division modulation system, there is a merit in that a function of an orthogonal frequency division modulation system may be realized in a domain that is efficient for calculation among frequency and time domains since the digital data are in the frequency and time domains due to a fast Fourier transform unit.

The orthogonal frequency division multiplexing wireless transmission system inverse-fast-Fourier transforms respective in-phase and quadrature-phase signals to convert them to digital signals by a digital/analog converter, and then wirelessly transmits the converted signals. A transmission signal converted to be a time domain digital signal by an inverse fast Fourier transform unit may be converted to the analog signal to be wirelessly transmitted. In this case, since the transmission signal is converted to the analog signal at a clock frequency which is the same as that of the digital signal, a signal distortion occurs by a sample/hold operation of the digital/analog converter at a radio frequency domain in a band. In order to prevent the signal distortion, the distortion is compensated by a digital filter at a time domain, or a digital signal having a high sample rate is converted to an analog signal after interpolation is performed by using a multiple of a sample frequency of a digital input signal, which will be described with FIG. 1.

FIG. 1 shows a schematic diagram of a transmitter in an orthogonal frequency division multiplexing transmission system according to the prior art.

As shown in FIG. 1, the orthogonal frequency division multiplexing transmission system according to the prior art includes a digital signal processor 110 including a digital modulator 101, an inverse fast Fourier transform (IFFT) unit 102, a parallel/serial data converter 103, a windowing or filtering unit 104, an inverse sync compensation filter 105, and a digital/analog converter 106, and an analog signal processor 120 including an in-phase and quadrature-phase (IQ) analog modulator 107, a radio frequency (RF) transmitter 108, and an antenna 109.

Referring to FIG. 1, a transmission digital signal is modulated by the digital modulator 101 in digital modulation methods including an M-phase shift keying (M-PSK) and an M-quadrature amplitude modulation (M-QAM), and is output as in-phase (I) and quadrature-phase (Q) signals.

The output IQ signals are respectively transformed from a frequency domain signal to a time domain signal by the inverse Fourier transform unit 102. The transformed signal is reconverted to the time domain signal by the parallel/serial data converter 103, and, if necessary, an interpolation operation may be performed by using the windowing or filtering unit 104. Since the above process requires various operations and a radio frequency clock signal, it may not be used in a potable terminal in which power consumption is very important.

Accordingly, the digital filter is not used in a transmitter of a portable terminal of the orthogonal frequency division multiplexing method. Since the digital signal input to the digital/analog converter 106 has the same sample rate as that of the output signal of the parallel/serial data converter 103, a sync function having a Null at a frequency corresponding to the signal sample rate causes a distortion at a frequency domain.

To compensate the distortion caused by the digital/analog converter 106, the input signal is compensated at the time domain by the inverse sync compensation filter 105 as a digital filter. However, since a considerable number of operations is required to form a filter in the above method, it is not easily used in the portable terminal.

Subsequently, the output IQ signals of the digital/analog converter 106 is converted to an intermediate frequency (IF) signal by the IQ analog modulator 107, the converted IF signal is converted to an RF signal and is transmitted to the antenna 109 by the RF transmitter 108, and the RF signal is wirelessly transmitted through the antenna 109.

As described above, in the conventional compensation method at the time domain, a filtering method is used to compensate a signal at the time domain since data at the frequency domain are difficult to be obtained in a conventional digital communication or in a code division multiple access (CDMA) communication, but a considerable number of operations is performed. In addition, in a method using the interpolation, an attenuation is generated relatively less in a band of an original signal to be transmitted since a zero point of the sync function is generated at a radio frequency by increasing a sample frequency of the digital/analog converter. However, there is a problem in that the number of operations is increased since the digital filter is used when the interpolation is performed, and a digital/analog converter operating at the radio frequency is used.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a device for processing frequency domain data before an inverse fast Fourier transform unit, and simply and efficiently compensating a distortion caused by a digital/analog converter at a frequency domain in an orthogonal frequency division multiplexing transmission system, and a method thereof.

An exemplary radio frequency distortion compensator according to an embodiment of the present invention receives a digital signal and a symbol synchronization signal from an external modem, performs a digital signal process, and outputs the signal to a digital/analog converter in an orthogonal frequency division multiplexing transmission system. The exemplary radio frequency distortion compensator includes a digital modulator, an inverse sync function coefficient generator, and a sync function compensator. The digital modulator receives the digital signal and converts it to in-phase and quadrature-phase signals. The inverse sync function coefficient generator stores an inverse sync function of distortion caused by a signal attenuation of a radio frequency signal input to the digital/analog converter, and outputs an output value of the inverse sync function corresponding to the input symbol synchronization signal as a compensation signal. The sync function compensator multiplies the compensation signal output from the inverse sync function coefficient generator by an output value of the digital modulator.

An exemplary radio frequency distortion compensator according to another embodiment of the present invention receives a digital signal and a symbol synchronization signal from an external modem, performs a digital signal process, and outputs the signal to a digital/analog converter in an orthogonal frequency division multiplexing transmission system. The exemplary radio frequency distortion compensator includes a digital modulator, a serial/parallel data converter, an inverse sync function coefficient generator, and a sync function compensator. The digital modulator receives the digital signal and converts it to in-phase and quadrature-phase signals. The serial/parallel data converter converts the signal output by the digital modulator into a frequency domain signal. The inverse sync function coefficient generator stores an inverse sync function of distortion caused by a signal attenuation of a radio frequency signal input to the digital/analog converter, and outputs an output value of the inverse sync function corresponding to the input symbol synchronization signal as a compensation signal. The sync function compensator multiplies the compensation signal output from the inverse sync function coefficient generator by an output value of the serial/parallel data converter.

In an exemplary method for receiving a digital signal and a symbol synchronization signal of an external modem, using a digital modulator and an inverse fast Fourier transform (IFFT) unit to perform a digital signal process, and compensating a distortion of a radio frequency output to a digital/analog converter in an orthogonal frequency division multiplexing transmission system, a coefficient of an inverse sync function is generated according to the number of transmission data except a sample frequency of an in-phase (I) signal and a quadrature-phase (Q) signal output through the digital modulator, and direct current (DC) and Null signals of the IFFT unit, the generated coefficient of the inverse sync function is multiplied by the signal output through the digital modulator, and the distortion is compensated.

In an exemplary method for receiving a digital signal and a symbol synchronization signal of an external modem, using a digital modulator and an inverse fast Fourier transform (IFFT) unit to perform a digital signal process, and compensating a distortion of a radio frequency output to a digital/analog converter in an orthogonal frequency division multiplexing transmission system, a coefficient of an inverse sync function is generated according to the number of transmission data except a sample frequency of an in-phase (I) signal and a quadrature-phase (Q) signal output through the digital modulator, and direct current (DC) and Null signals of the IFFT unit, a signal output through the digital modulator is converted into parallel data, the converted data is multiplied by the generated coefficient of the inverse sync function by using a plurality of multipliers, and the distortion is compensated.

BRIEF DESCRIPTION OF THE DRAWINGS

FIG. 3 shows a diagram of a configuration of a radio frequency distortion compensator of an orthogonal frequency division multiplexing transmission system according to a second exemplary embodiment of the present invention.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive.

Throughout this specification and the claims which follow, unless explicitly described to the contrary, the word "comprise", and variations such as "comprises" or "comprising", will be understood to imply the inclusion of stated elements but not the exclusion of any other elements.

Figure 1:
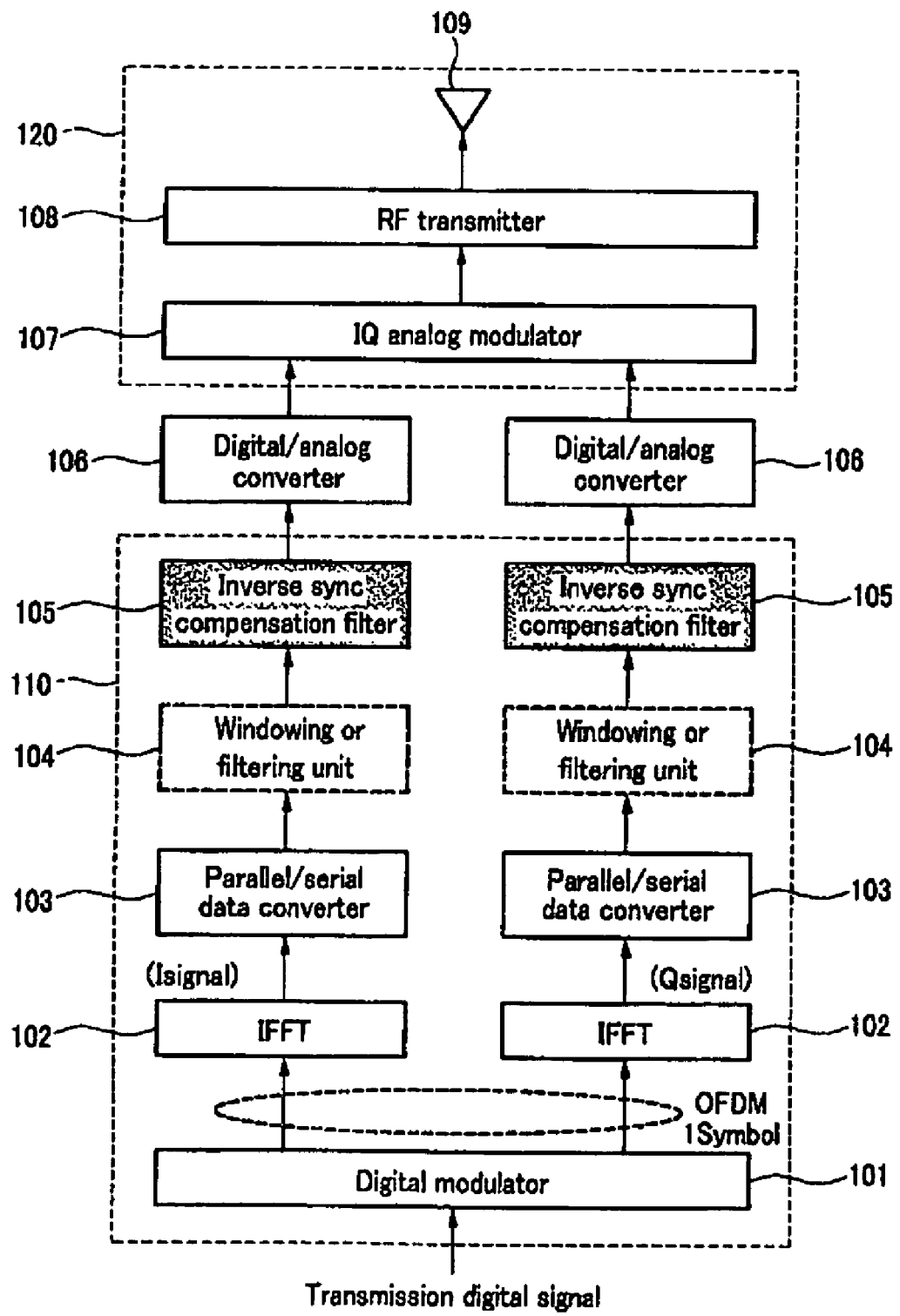
FIG. 1 shows a schematic diagram of a transmitter in an orthogonal frequency division multiplexing transmission system according to the prior art.
Figure 2:
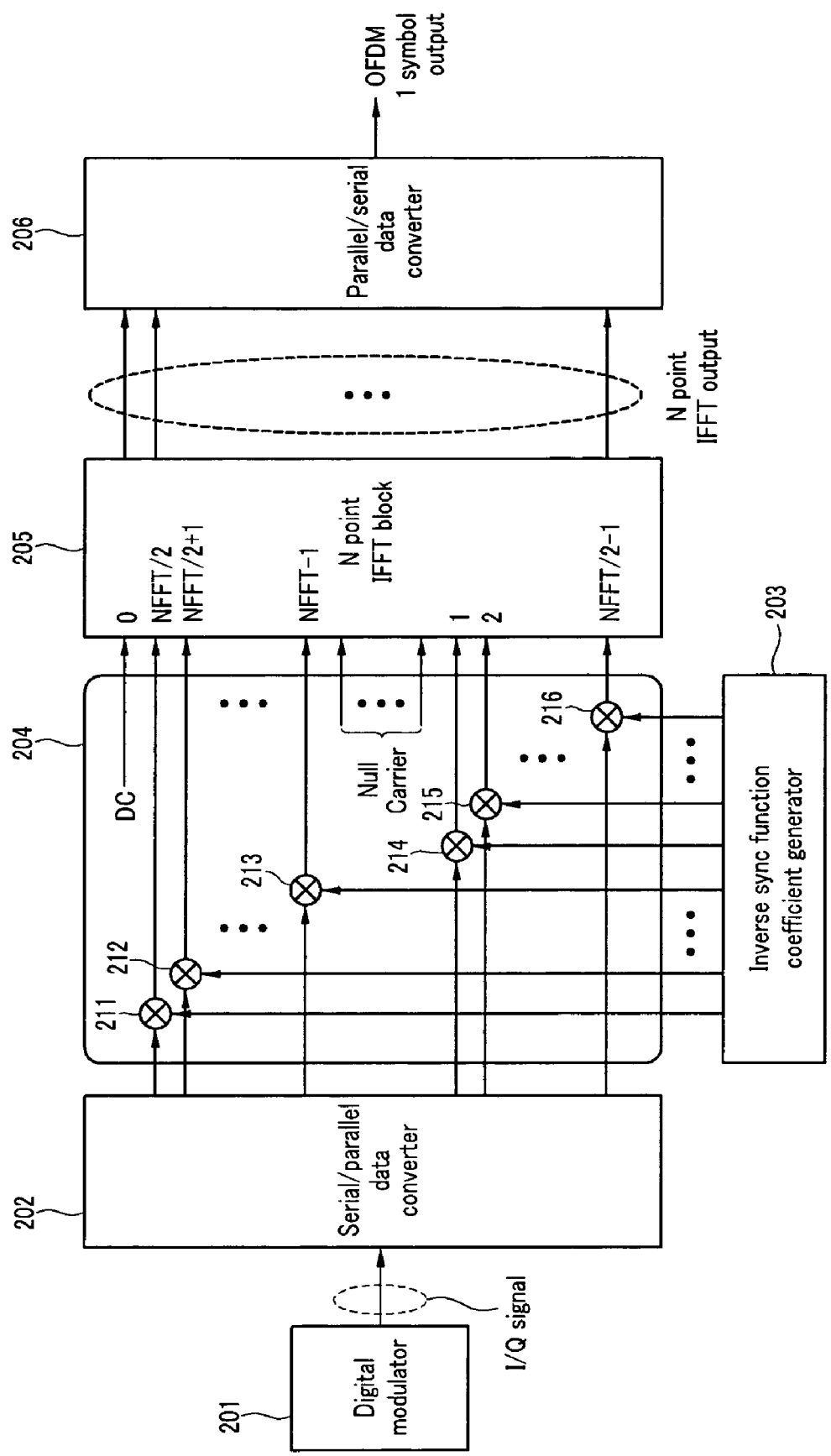
FIG. 2 shows a diagram of a configuration of a radio frequency distortion compensator of an orthogonal frequency division multiplexing transmission system according to a first exemplary embodiment of the present invention.

FIG. 2 shows a diagram of a configuration of a radio frequency distortion compensator of an orthogonal frequency division multiplexing transmission system according to a first exemplary embodiment of the present invention, and the radio frequency distortion compensator compensates a distortion of a digital/analog converter in parallel.

Referring to FIG. 2, the radio frequency distortion compensator of orthogonal frequency division multiplexing transmission system according to the first exemplary embodiment of the present invention includes a digital modulator 201, a serial/parallel data converter 202, a sync function compensator 204, an inverse sync function coefficient generator 203, an inverse fast Fourier transform (IFFT) unit 205, and a parallel/serial data converter 206.

The digital modulator 201 receives a digital signal and converts it to in-phase and quadrature-phase signals. The serial/parallel data converter 202 converts the signal output by the digital modulator 201 into a frequency domain signal, and outputs it. The inverse sync function coefficient generator 203 stores an inverse sync function of distortion caused by a signal attenuation of a radio frequency signal input to the digital/analog converter, and outputs an output value of the inverse sync function corresponding to an input symbol synchronization signal as a compensation signal. A sync function compensator 204 multiplies the compensation signal output from the inverse sync function coefficient generator 203 by an output value of the serial/parallel data converter 202, and outputs it. The IFFT unit 205 inverse fast Fourier transforms an output of the sync function compensator 204, and outputs it. The parallel/serial data converter 206 converts an output of the IFFT unit 205 into a time domain signal, and outputs it to the digital/analog converter.

An operation of the radio frequency distortion compensator of the orthogonal frequency division multiplexing transmission system according to the first exemplary embodiment of the present invention will now be described.

Firstly, a signal modulated to IQ signals by the digital modulator 201 is output through the serial/parallel data converter 202.

In addition, the inverse sync function coefficient generator 203 uses the inverse sync function of distortion caused by the signal attenuation of the radio frequency signal input to the digital/analog converter, and outputs the output value of the inverse sync function corresponding to the input of the symbol synchronization signal as the compensation signal.

Then, the sync function compensator 204 uses a plurality of multipliers 211 to 216 to multiply the compensation signal output from the inverse sync function coefficient generator 203 by the output value of the serial/parallel data converter 202.

The parallel data compensated as above are input to the IFFT unit 205. Since the input signal of the IFFT unit 205 is the frequency domain signal, the sync function distortion caused by the digital/analog converter is compensated at a frequency domain.

The distortion may be compensated since the input signals of the IFFT unit 205 at respective frequency domains are multiplied by an inverse sync function value generated by the inverse sync function coefficient generator 203 as a weight value.

However, a considerable number of operations is necessary since the parallel frequency domain data are respectively multiplied by a coefficient by using the plurality of multipliers 211 to 216. A method for reducing the number of operations will now be described.

FIG. 3 shows a diagram of a radio frequency distortion compensator using a single multiplier and a lookup table according to a second exemplary embodiment of the present invention.

Referring to FIG. 3, the radio frequency distortion compensator of the orthogonal frequency division multiplexing transmission system according to the second exemplary embodiment of the present invention includes a digital modulator 301, a serial/parallel data converter 304, a sync function compensator 303, an inverse sync function coefficient generator 302, an inverse fast Fourier transform (IFFT) unit 305, and a parallel/serial data converter 306.

The digital modulator 301 receives the digital signal and converts it to the in-phase and quadrature-phase signals.

The inverse sync function coefficient generator 302 stores the inverse sync function of distortion caused by the signal attenuation of the radio frequency signal input to the digital/analog converter, and outputs the output value of the inverse sync function corresponding to the input symbol synchronization signal as a compensation signal. The sync function compensator 303 multiplies the compensation signal output from the inverse sync function coefficient generator 302 by an output value of the digital modulator 301, and outputs it. In this case, the sync function compensator 303 uses a single multiplier. The serial/parallel data converter 304 converts the signal output by the sync function compensator 303 into the frequency domain signal, and outputs it. The IFFT unit 305 inverse fast Fourier transforms an output of the serial/parallel data converter 304, and outputs it. The parallel/serial data converter 306 converts an output of the IFFT unit 305 into the time domain signal, and outputs it to the external digital/analog converter.

An operation of the radio frequency distortion compensator of the orthogonal frequency division multiplexing wireless system according to the second exemplary embodiment of the present invention is similar to that according to the first exemplary embodiment of the present invention except that the radio frequency distortion compensator according to the second exemplary embodiment of the present invention uses a single multiplier, which will now be described.

Firstly, in the sync function compensator 303 including the single multiplier, the IQ signals output through the digital modulator 301 to compensate the sync function distortion caused by the digital/analog converter 106 are multiplied by an inverse sync function coefficient generated by the inverse sync function coefficient generator 302.

The IQ data obtained by multiplying the serial frequency domain data by a compensation coefficient by the sync function compensator 303 are output through the serial/parallel data converter 304, and are converted to the time domain data by the IFFT unit 305. The parallel time domain data are converted to the serial time domain data by the parallel/serial data converter 306, and are output to the digital/analog converter.

In the above method, the radio frequency distortion compensator may be more efficiently realized compared to a method using the digital filter at the time domain to compensate the distortion of the digital/analog converter, since it uses the single multiplier and the single lookup table generating the inverse sync function coefficient.

Figure 4A:
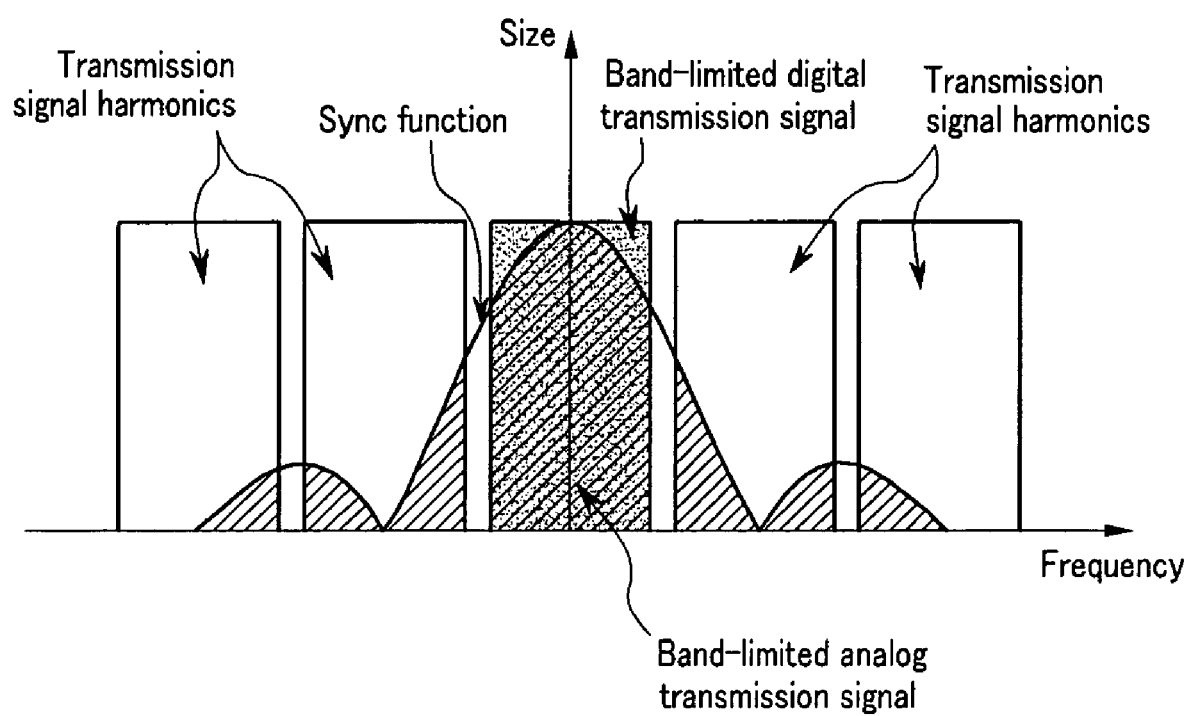
FIG. 4A and FIG. 4B respectively show diagrams representing an input and an output of the radio frequency distortion compensator for compensating the distortion caused by the digital/analog converter as shown in FIG. 3.
Figure 4B:
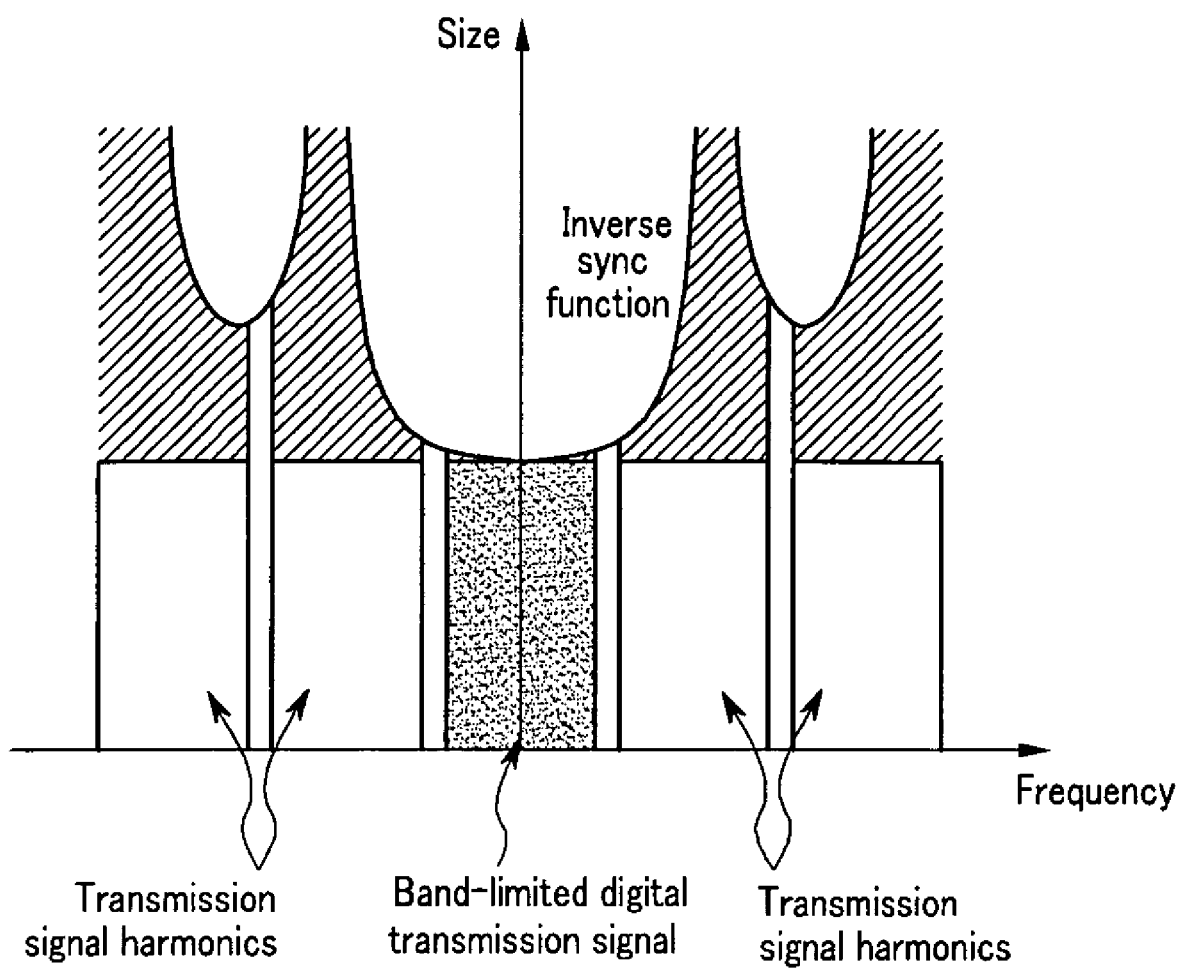

FIG. 4A and FIG. 4B respectively show diagrams representing an input and an output of the radio frequency distortion compensator for compensating the distortion caused by the digital/analog converter as shown in FIG. 3.

As shown in FIG. 4A, in an orthogonal frequency division multiplexing transmission system without compensating the distortion of the digital/analog converter, a transmission signal spectrum is at a center frequency $f_c$ of a signal to be transmitted, and a spectrum that is the same as the transmission signal spectrum is at a center frequency shown in Equation 1 corresponding to an integral multiple of a transmission signal data rate $f_s$.

Harmonic center frequency of transmission
spectrum=$f_c \pm n f_e$, $n$=integer [Equation 1]

The spectrum that is the same as that of a transmission frequency is at the center frequency given as Equation 1, the transmission signal data rate $f_s$ is multiplied by a transfer function H(f) given as Equation 2 having a zero point by performing a sample/hold operation of the digital/analog converter, and a distortion occurs in an output signal.

$$H(f) = \operatorname{sinc}(\pi f / f_s)$$
$$= \frac{\sin(\pi f / f_s)}{\pi f / f_s} \cdot e^{-j\pi f / f_s}$$

[Equation 2]

In FIG. 4A, characteristics of the sync function that is the transfer function given as Equation 2 are illustrated at the frequency domain. The transmission signal spectrum without compensating the distortion of the digital/analog converter is given as Equation 3, and it is shown that the signal is distorted at the radio frequency domain of an oblique-lined area in FIG. 4A.

$$S'(f) = H(f) \cdot S(f) \quad \text{[Equation 3]}$$

FIG. 4B shows a diagram representing a process using an inverse sync function given as Equation 4 to compensate the spectrum distorted by the sync function of Equation 2 as shown in FIG. 4.

$$H(f)^{-1} = 1/\sin c(\pi f/f_c) \quad \text{[Equation 4]}$$

As shown in FIG. 4B, since a band-limited signal to be transmitted is multiplied by the inverse sync function given as Equation 4, the distortion caused by the radio frequency signal attenuation by the digital/analog converter is compensated, and the radio frequency signal is relatively increased and transmitted.

Figure 5:
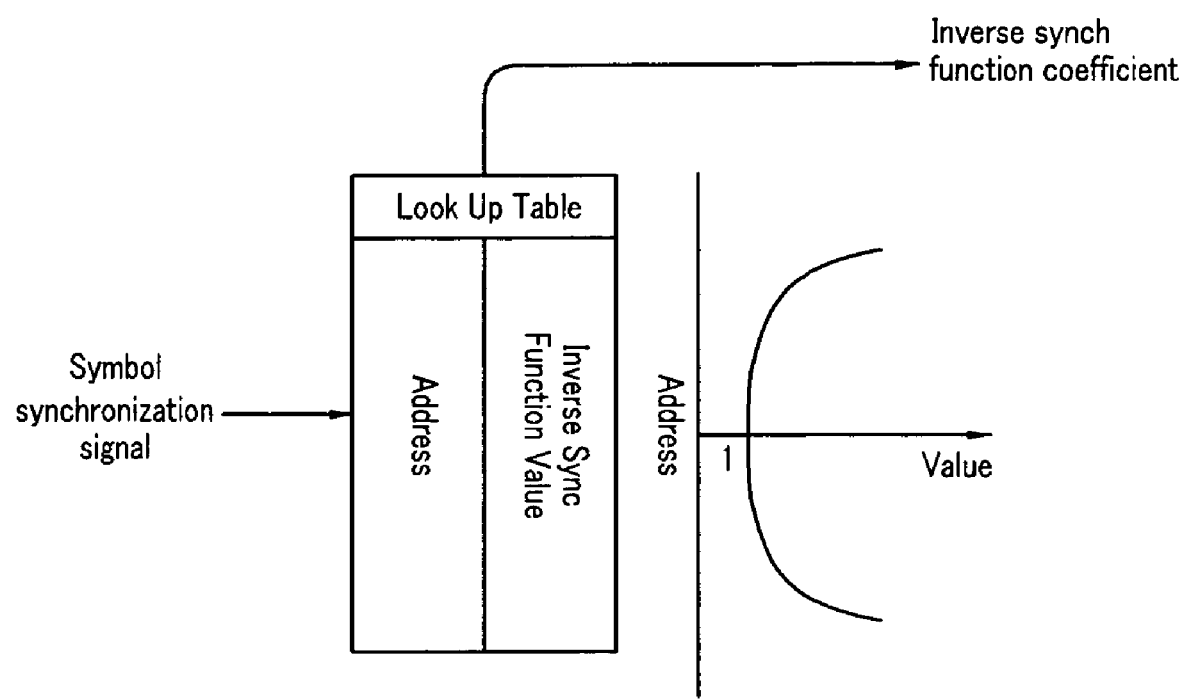
FIG. 5 shows a diagram of an internal configuration of the inverse sync function coefficient generator shown in FIG. 3.

FIG. 5 shows a diagram of an internal configuration of the inverse sync function coefficient generator shown in FIG. 3.

As shown in FIG. 5, the inverse sync function coefficient generator 302 includes a single lookup table, and the lookup table includes an inverse sync function value corresponding to one OFDM symbol. Accordingly, the inverse sync function coefficient generator 302 is synchronized with an OFDM symbol synchronization signal, and outputs the inverse sync function value of the lookup table.

Figure 6A:
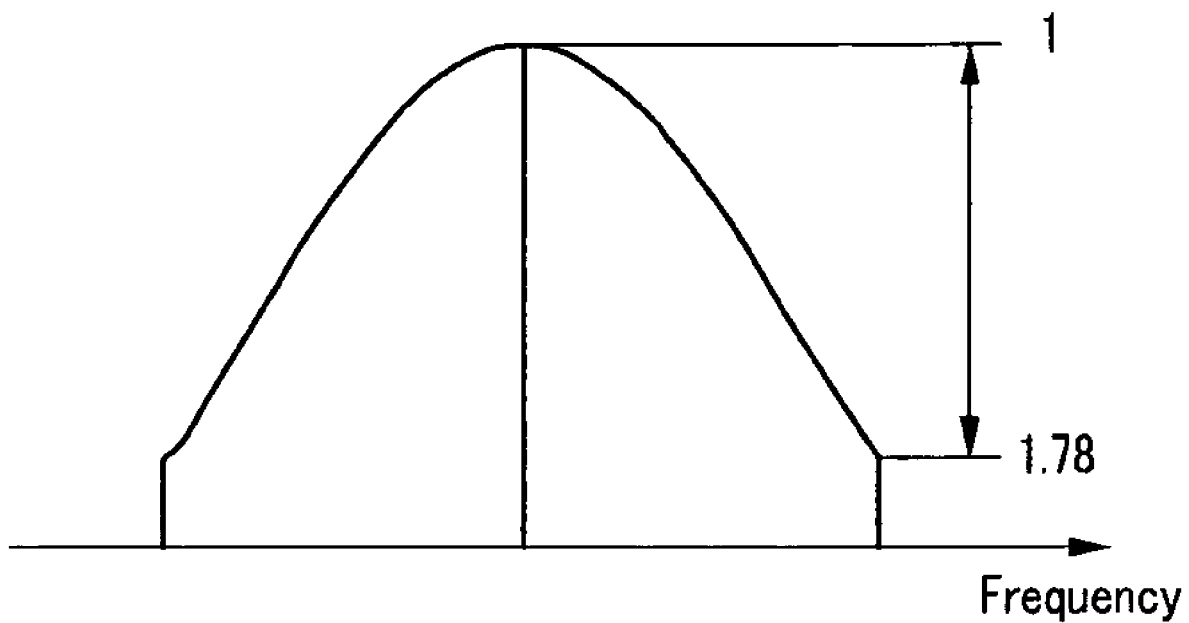
FIG. 6A to FIG. 6D respectively show diagrams representing coefficient generation and data of the lookup table in the inverse sync function coefficient generator shown in FIG. 5.
Figure 6B:
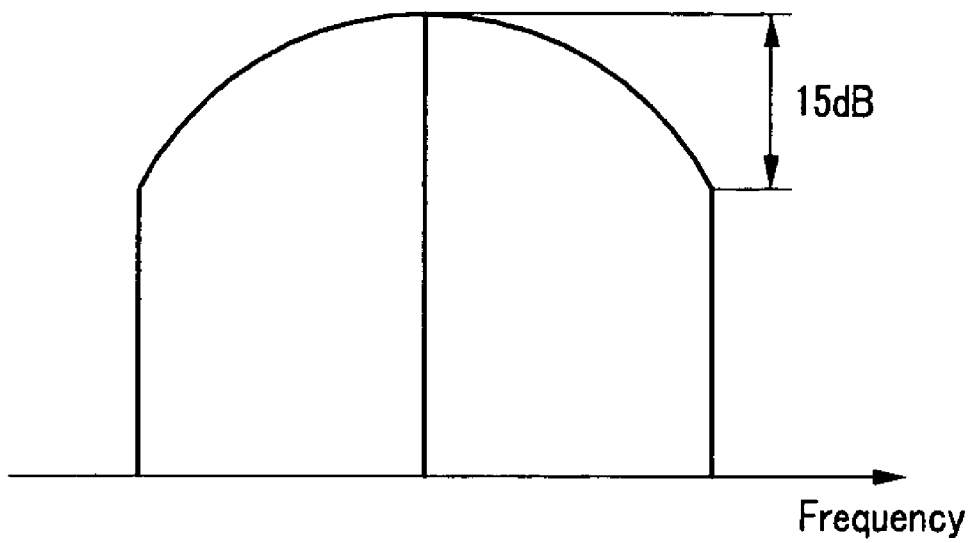

FIG. 6A to FIG. 6D respectively show diagrams representing coefficient generation and data of the lookup table in the inverse sync function coefficient generator 302 shown in FIG. 5. That is, when a frequency bandwidth is 10 MHz, a data rate of the transmission data is 10 MHz, the number of OFDM single frequencies is 864, and a 1024-point FFT is used in the OFDM transmission system, the spectrum of an edge radio-frequency signal compared to the center frequency becomes 0.18 by performing the sample/hold operation of the digital/analog converter as shown in FIG. 6A, and the attenuation of 15 dB is thus generated as shown in FIG. 6B.

Figure 6C:
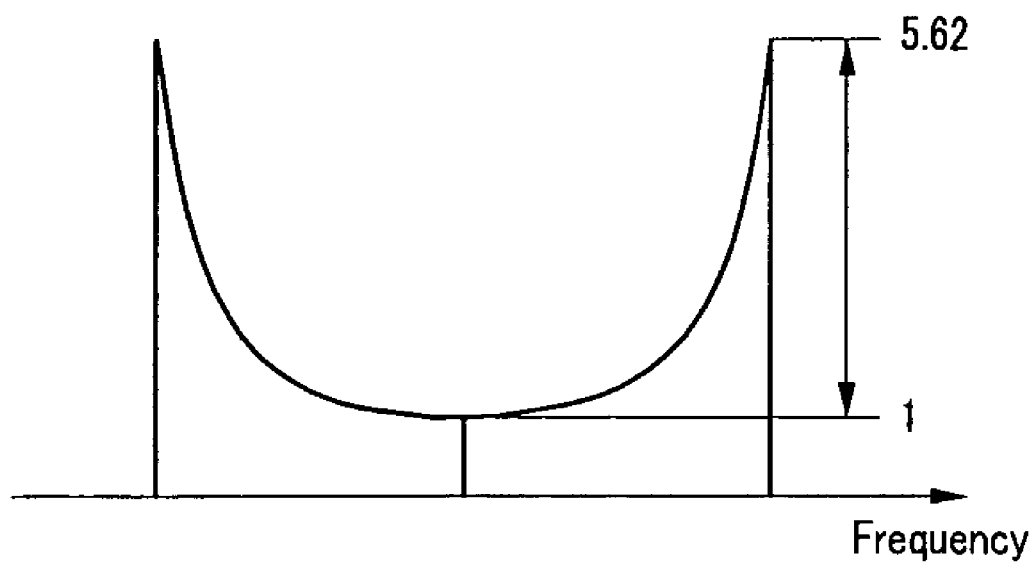
Figure 6D:
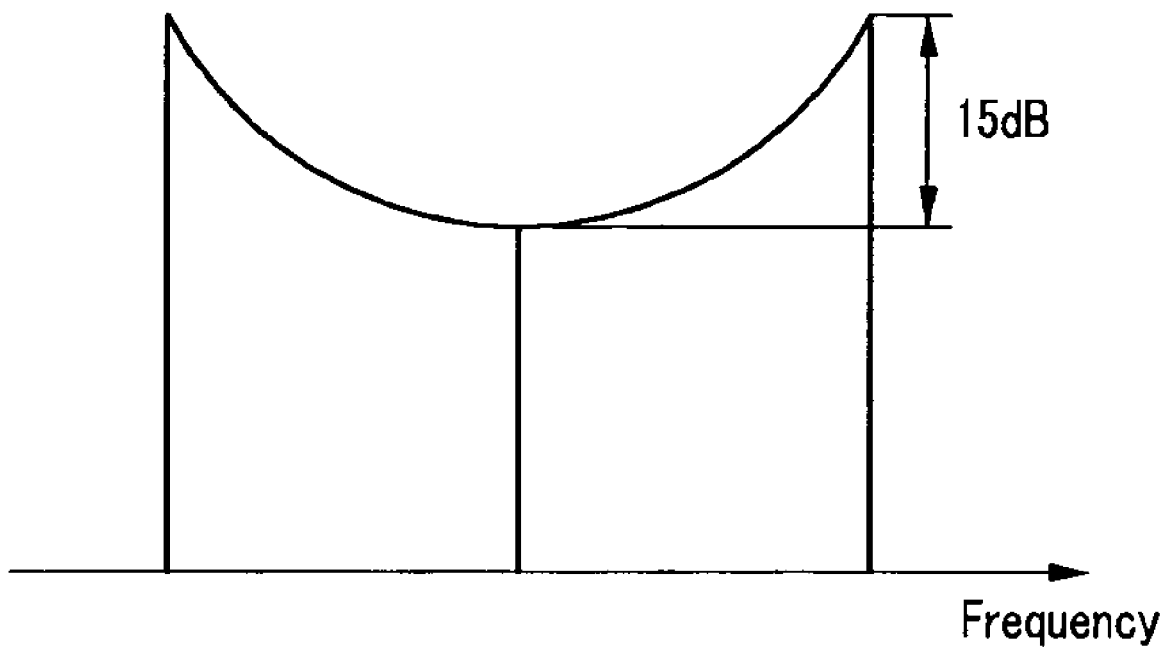

To compensate the attenuation, the transmission signal spectrum of the frequency signal which is farthest from the center frequency signal is amplified 5.62 times to be transmitted as shown in FIG. 6C, which makes a difference of 15 dB as shown in FIG. 6D.

Accordingly, the data shown in FIG. 6C are stored in the lookup table of the inverse sync function generator 302 shown in FIG. 5 according to the number of the single frequencies of the OFDM signal to be transmitted.

As described above, to compensate the frequency distortion of the digital/analog converter in the orthogonal frequency division multiplexing transmission system according to the exemplary embodiment of the present invention, a compensator may be simply formed by the single lookup table forming the inverse sync function generator and the single multiplier forming the sync function compensator.

The drawings and the detailed description are not restrictive but illustrative of the present invention. While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

According to the exemplary embodiment of the present invention, the radio frequency distortion of the digital/analog converter in the orthogonal frequency division multiplexing transmission system may be simply compensated by using the single multiplier and the single lookup table forming the inverse sync function generator.

In addition, a power-efficiency may be increased by using a low system operational frequency since the system operational frequency of an orthogonal frequency division multiplexing system is equalized to a sample frequency of data to be transmitted, according to the exemplary embodiment of the present invention.

A simple and efficient wireless system may be formed since a complicated circuit configuration, such as the digital filter, is not used.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A radio frequency distortion compensator receiving a digital signal and a symbol synchronization signal from an external modem, performing a digital signal process, and outputting a signal to a digital/analog converter in an orthogonal frequency division multiplexing transmission system, the radio frequency distortion compensator comprising:
   a digital modulator for receiving the digital signal and converting the digital signal to serial in-phase and quadrature-phase signals,
   wherein a digital process is performed on the digital signal, the digital signal process being performed after the serial in-phase and quadrature-phase signals are converted by a serial/parallel data converter, and
   wherein the digital processed digital signal is input to the digital/analog converter;
   an inverse sync function coefficient generator configured for storing an inverse sync function,
   wherein the stored inverse sync function is based on distortion caused by a signal attenuation of a radio frequency signal input to the digital/analog converter, and
   wherein the inverse sync function coefficient generator outputs an output value of the inverse sync function corresponding to a symbol generated from the attenuated signal of the radio frequency signal when the input symbol synchronization signal from the external modem is input to the inverse function coefficient generator, the output value being a compensation signal;
   a sync function compensator for multiplying the compensation signal output from the inverse sync function coefficient generator by an output value of the digital modulator; and
   the serial/parallel data converter for converting a signal output from the sync function compensator into a frequency domain signal.

2. The radio frequency distortion compensator of claim 1, wherein the inverse sync function coefficient generator is synchronized with the symbol synchronization signal, and includes a lookup table for storing information of the inverse sync function corresponding to the symbol.

3. The radio frequency distortion compensator of claim 1, wherein the sync function compensator comprises a multiplier for multiplying a compensation coefficient generated from the inverse sync function coefficient generator by transmission data corresponding to a symbol in a frequency domain of an output signal of the digital modulator.

4. The radio frequency distortion compensator of claim 1, wherein the inverse sync function stored in the inverse sync function coefficient generator is given as a following equation, $H(f)^{-1} = 1/\operatorname{sinc}(\pi f/f_s)$ a harmonic center frequency of a transmission spectrum is $f_c \pm nf_s$ wherein n denotes an integer, $f_c$ denotes a center frequency, and $f_s$ denotes a transmission signal data rate, and H(f) denotes a transfer function for a transmission signal data rate given as $$H(f) = \operatorname{sinc}(\pi f/f_s)$$
$$= \frac{\sin(\pi f/f_s)}{\pi f/f_s} \cdot e^{-j\pi f/f_s}.$$

5. The radio frequency distortion compensator of any one of claim 1 to claim 4, further comprising:
   an inverse fast Fourier transform (IFFT) unit for inverse fast Fourier transforming an output of the serial/parallel data converter; and
   the digital/analog converter for converting an output of the IFFT unit into a time domain signal.

6. A method an orthogonal frequency division multiplexing transmission system, the method comprising:
   receiving a digital signal and a symbol synchronization signal from an external modem;
   converting the digital signal to serial in-phase and quadrature-phase signals,
   performing digital signal processing on the digital signal by using an inverse fast Fourier transform (IFFT), the IFFT being performed after the serial in-phase and quadrature-phase signals are converted into parallel data, and
   wherein the digital processed digital signal by the IFFT is input to a digital/analog converter;
   generating a coefficient of an inverse sync function according to the number of transmission data except for direct current (DC) and Null signals of the IFFT,
   wherein the generated inverse sync function is based on distortion caused by a signal attenuation of a radio frequency signal input to the digital/analog converter,
   wherein the generated coefficient of the inverse sync function corresponds to a symbol generated from the attenuated signal of the radio frequency signal when the input symbol synchronization signal from the external modem is received, and
   wherein the generated inverse sync function coefficient is synchronized with the received symbol synchronization signal from the external modem, and includes a lookup table for storing and generating the inverse sync function corresponding to the symbol;
   multiplying the generated coefficient of the inverse sync function by the serial in-phase and quadrature-phase signal output through the digital modulator and compensating the distortion; and
   converting the multiplied serial in-phase and quadrature-phase signal to the parallel data for being output into a frequency domain signal.

7. The method of claim 6, further comprising:
   the inverse fast Fourier transforming the frequency domain signal; and
   converting the inverse fast Fourier transformed frequency domain signal into a time domain signal, and outputting it to the digital/analog converter.

8. The method of claim 6 or claim 7, wherein a multiplier is used when the generated coefficient of the inverse sync function is multiplied by the signal output through the digital modulator to compensate the distortion.

* * * * *